Patented Nov. 12, 1935

2,020,671

UNITED STATES PATENT OFFICE 2,020,671

MANUFACTURE OF OXYGENATED ORGANIC COMPOUNDS

Henry Dreyfus, London, England

No Drawing. Application July 21, 1930, Serial No. 469,650. In Great Britain July 24, 1929

7 Claims. (Cl. 260—116)

This invention relates to improvements in organic syntheses and in particular in the production of oxygenated organic compounds.

I have found that oxygenated organic compounds may be produced by bringing a paraffin hydrocarbon, particularly the lower paraffin hydrocarbons such as methane, ethane, to reaction with steam, and the present invention is based on this discovery.

The gases or vapours are most advantageously brought to reaction in presence of catalytic agents, and in particular catalytic agents consisting of or containing metals, metal oxides or other metallic compounds. The reaction may be, and preferably is, conducted under pressure, for example 50 or 100 atmospheres or more, and is most advantageously effected at relatively high pressures, such as 200, 300 or 500 atmospheres or more. Again the reaction temperature may vary from relatively low temperatures such as 200° to relatively high temperatures such as 700° or more. Particularly valuable products are obtainable by using temperatures intermediate within this range, for example temperatures of 250°, 300°, 350°, 400° or 500° C.

A very large number of metals and metallic compounds have a catalytic effect upon the reaction. The alkaline earth metals may be used as catalysts or any of the metals of groups 4, 5, 6, 7 and 8 of the periodic system, and also in addition aluminium, magnesium and zinc. The alkali metals and their compounds are preferably used in conjunction with other metals. Copper, silver and gold have also a catalytic effect but as with the alkali metal compounds they are preferably used in conjunction with other metals or metal compounds. As examples of metallic catalysts which I may use for promoting the production of oxygenated organic compounds according to the present invention I may instance zinc, magnesium, calcium, aluminium, chromium, manganese, vanadium, molybdenum, titanium, iron, nickel and cobalt and the rare earth metals. Such metals may be used in the metallic state but are preferably used in the form of oxides or hydroxides or other compounds and particularly compounds with the metalloids, such as sulphur or arsenic, or as salts of the oxy acids of metalloids, for example phosphates, silicates and borates. It is frequently of advantage to use two or more of the above metals or their compounds in admixture or in chemical combination, and in this connection it may be stated that the various admixtures and chemical compounds containing two or more metals which influence favourably the production of oxygenated organic compounds from carbon monoxide or carbon dioxide and hydrogen are also of value in promoting or directing the reactions according to the present invention. As instances of such compounds for use according to the present invention I may mention zinc chromate, manganese chromate, zinc vanadate, zinc manganate, zinc tungstate or zinc molybdate, or the corresponding salts of other metals such as magnesium, calcium or aluminium. I may also use any of the catalysts or catalyst mixtures containing cobalt nickel and iron referred to in my British Patents Nos. 337,014 and 337,409 and in my corresponding United States applications S. Nos. 469,648 and 469,649 both filed July 21, 1930. The relative proportions of metals in the particular catalyst mixture employed also exercises a directive influence on the course of the syntheses. For example alkali and alkali earth metals may be used in conjunction with other metals in any proportion but most valuable results are in general obtainable by employing equimolecular proportions or proportions in which the alkali or alkaline earth metal predominates, e. g. proportions of 1½ or 2 or more molecules of alkali or alkaline earth metal to 1 molecule of other metal.

While the present invention comprises broadly the production of oxygenated organic compounds from mixtures consisting of or containing a paraffin hydrocarbon and steam, results of particular value are obtainable from methane used in conjunction with steam or in conjunction with steam and a gas or gases capable of yielding oxygen, for instance carbon monoxide or dioxide. To the reaction gases I may further add other gases capable of exercising either a reducing or oxidizing effect. For example additions of oxygen may be made, such additions being preferably small in comparison with the total volume of the reaction gases, so as to produce compounds of a higher order of oxidation, such as aldehydes, ketones or acids. On the other hand additions of hydrogen may be made to the reaction gases so as to improve the yield of oxygenated organic compounds of a lower order of oxidation such as alcohols. The addition of inert gases, such as nitrogen, to the reacting gases frequently tends to retard the production of undesirable gaseous decomposition products.

The reaction according to the present invention may be conducted in any suitable apparatus, for example apparatus made of copper or alloys of copper, or of steel lined with copper or alloys of copper, or made of steel containing vanadium, manganese, cobalt, nickel or the like.

The following examples serve to illustrate convenient forms of execution of the invention, it being understood that they are given only by way of illustration and are in no way limitative.

Example 1

A mixture of steam and methane containing about 1-5 parts by volume of steam to each part of methane is passed under a pressure of about 180-250 atmospheres over or in contact with a catalyst mass composed of a mixture of potassium bichromate and zinc oxide (e. g. containing between 20 and 50% zinc oxide) heated to a temperature between 350° and 450° C.

There results a copious yield of oxygenated organic compounds composed essentially of ethanol and higher aliphatic alcohols, whilst the production of more oxidized products such as aldehydes, acids and ketones is substantially avoided.

Example 2

A mixture of steam, methane and oxygen containing about 1-5 parts by volume of steam to each part of methane and between 5 and 20% oxygen relatively to the steam, is passed under a pressure of between 150 and 250 atmospheres in contact with a catalyst mass composed of a mixture of zinc chromate and cobalt oxide (e. g. containing between 20 and 30% zinc chromate) at a temperature between about 380° and 500° C.

There results a copious yield of oxygenated organic compounds composed essentially of aliphatic aldehydes and acids (including acetic acid, acetaldehyde and higher acids and aldehydes) in substantial absence of aliphatic alcohols.

Example 3

A mixture of methane, steam and hydrogen containing between 1-5 parts of steam to each part of methane and containing between about 10 and 40% hydrogen relatively to the steam, is passed under a pressure of between 150 and 200 atmospheres in contact with zinc chromate heated to a temperature of between 250° and 325° C.

There results a copious yield of oxygenated organic compounds composed substantially of methanol together with higher aliphatic alcohols.

What I claim and desire to secure by Letters Patent is:—

1. Process for the manufacture of oxygenated organic compounds, which comprises subjecting a normally gaseous paraffin hydrocarbon to reaction with steam under a pressure of at least 50 atmospheres and at a temperature below 700° C. in the presence of an oxide-free catalyst mass comprising as the essential catalytic constituent a salt of an inorganic oxy-acid with a metal selected from the group consisting of the alkaline earth metals, magnesium, zinc and aluminum.

2. Process for the manufacture of oxygenated organic compounds, which comprises subjecting a normally gaseous paraffin hydrocarbon to reaction with steam under a pressure of at least 50 atmospheres and at a temperature below 700° C. in the presence of an oxide-free catalyst mass comprising as the essential catalytic constituent a salt of a weak inorganic oxy-acid with a metal selected from the group consisting of the alkaline earth metals, magnesium, zinc and aluminum.

3. Process for the manufacture of oxygenated organic compounds, which comprises subjecting methane to reaction with steam under a pressure of at least 50 atmospheres and at a temperature below 700° C. in the presence of an oxide-free catalyst mass comprising as the essential catalytic constituent a salt of an inorganic oxy-acid with a metal selected from the group consisting of the alkaline earth metals, magnesium, zinc and aluminum.

4. Process for the manufacture of oxygenated organic compounds, which comprises subjecting a normally gaseous paraffin hydrocarbon to reaction with steam at a temperature between 200 and 500° C. and under a pressure of at least 50 atmospheres in the presence of an oxide-free catalyst mass comprising as the essential catalytic constituent a salt of an inorganic oxy-acid with a metal selected from the group consisting of the alkaline earth metals, magnesium, zinc and aluminum.

5. Process for the manufacture of oxygenated organic compounds, which comprises subjecting a normally gaseous paraffin hydrocarbon to reaction with steam at a temperature between 200 and 500° C. and under a pressure of at least 50 atmospheres in the presence of an oxide-free catalyst mass comprising as the essential catalytic constituent a salt of a weak inorganic oxy-acid with a metal selected from the group consisting of the alkaline earth metals, magnesium, zinc and aluminum.

6. Process for the manufacture of oxygenated organic compounds, which comprises subjecting methane to reaction with steam at a temperature between 200 and 500° C. and under a pressure of at least 50 atmospheres in the presence of an oxide-free catalyst mass comprising as the essential catalytic constituent a salt of an inorganic oxy-acid with a metal selected from the group consisting of the alkaline earth metals, magnesium, zinc and aluminum.

7. Process for the manufacture of oxygenated organic compounds, which comprises subjecting methane to reaction with steam at a temperature between 200 and 500° C. and under a pressure above 50 atmospheres in the presence of an oxide-free catalyst mass comprising as the essential catalytic constituent zinc chromate.

HENRY DREYFUS.